United States Patent
Ylitalo

(10) Patent No.: US 7,277,730 B2
(45) Date of Patent: Oct. 2, 2007

(54) METHOD OF ALLOCATING RADIO RESOURCES IN TELECOMMUNICATION SYSTEM, AND TELECOMMUNICATION SYSTEM

(75) Inventor: Juha Ylitalo, Oulu (FI)

(73) Assignee: Nokia Corporation, Espoo (FI)

( * ) Notice: Subject to any disclaimer, the term of this patent is extended or adjusted under 35 U.S.C. 154(b) by 626 days.

(21) Appl. No.: 10/328,191

(22) Filed: Dec. 26, 2002

(65) Prior Publication Data

US 2004/0204111 A1    Oct. 14, 2004

(51) Int. Cl.
*H04M 1/00* (2006.01)
*H03C 7/02* (2006.01)

(52) U.S. Cl. .................... 455/562.1; 455/101

(58) Field of Classification Search ............. 455/562.1, 455/63.4, 101, 272, 276.1, 427, 450; 342/373, 342/407, 372, 371, 457, 374, 42; 375/347; 356/141.3
See application file for complete search history.

(56) References Cited

U.S. PATENT DOCUMENTS

| | | | | |
|---|---|---|---|---|
| 5,576,721 A | * | 11/1996 | Hwang et al. | 343/753 |
| 5,594,447 A | * | 1/1997 | Usui et al. | 342/42 |
| 5,600,436 A | * | 2/1997 | Gudat | 356/141.3 |
| 5,666,123 A | * | 9/1997 | Chrystie | 342/373 |
| 5,754,138 A | * | 5/1998 | Turcotte et al. | 342/373 |
| 5,757,318 A | * | 5/1998 | Reudink | 342/374 |
| 5,898,928 A | * | 4/1999 | Karlsson et al. | 455/450 |
| 5,952,965 A | * | 9/1999 | Kowalski | 342/372 |
| 5,966,094 A | * | 10/1999 | Ward et al. | 342/373 |
| 6,038,459 A | * | 3/2000 | Searle et al. | 455/562.1 |
| 6,043,779 A | * | 3/2000 | Lalezari et al. | 342/371 |
| 6,075,484 A | | 6/2000 | Daniel et al. | |
| 6,091,788 A | * | 7/2000 | Keskitalo et al. | 375/347 |
| 6,094,165 A | * | 7/2000 | Smith | 342/373 |
| 6,138,012 A | * | 10/2000 | Krutz et al. | 455/427 |

(Continued)

FOREIGN PATENT DOCUMENTS

| | | |
|---|---|---|
| EP | 0 786 914 A2 | 7/1997 |
| WO | WO 00/21216 | 4/2000 |

*Primary Examiner*—Joseph Feild
*Assistant Examiner*—Kiet Doan
(74) *Attorney, Agent, or Firm*—Squire, Sanders & Dempsey L.L.P.

(57) ABSTRACT

The invention relates to a method of allocating radio resources and a telecommunication system including a base station and user equipment. The base station includes a beam forming device configured to form at least two primary beams for signal reception. The antenna array and the beam forming device of the base station are configured to receive a signal transmitted by the user equipment using at least two primary beams, thus providing primary beam-specific signals as output. The base station includes a processing device for determining at least two secondary beam-specific variables associated with two secondary beams using the primary beam-specific signals as input and a transformation between the primary antenna beams and the secondary antenna beams. The telecommunication system further includes an allocation device for allocating radio resources to the user equipment based on the secondary beam-specific variables.

32 Claims, 7 Drawing Sheets

U.S. PATENT DOCUMENTS

| | | | |
|---|---|---|---|
| 6,233,466 B1 * | 5/2001 | Wong et al. | 455/562.1 |
| 6,377,783 B1 * | 4/2002 | Lo et al. | 455/101 |
| 6,397,082 B1 * | 5/2002 | Searle | 455/562.1 |
| 6,453,177 B1 * | 9/2002 | Wong et al. | 455/562.1 |
| 6,639,554 B2 * | 10/2003 | Kim et al. | 342/457 |
| 6,694,154 B1 * | 2/2004 | Molnar et al. | 455/562.1 |
| 6,768,913 B1 * | 7/2004 | Molnar et al. | 455/562.1 |
| 6,823,174 B1 * | 11/2004 | Masenten et al. | 455/63.4 |
| 6,847,327 B2 * | 1/2005 | Ylitalo | 342/407 |
| 6,879,845 B2 * | 4/2005 | Suzuki et al. | 455/562.1 |
| 6,980,832 B1 * | 12/2005 | Ylitalo et al. | 455/562.1 |
| 2002/0115474 A1 * | 8/2002 | Yoshino et al. | 455/562 |
| 2003/0040337 A1 * | 2/2003 | Ylitalo | 455/562 |
| 2004/0087281 A1 * | 5/2004 | Ylitalo | 455/101 |

\* cited by examiner

METHOD OF ALLOCATING RADIO RESOURCES IN TELECOMMUNICATION SYSTEM, AND TELECOMMUNICATION SYSTEM

FIELD

The invention relates to a method of allocating radio resources in a telecommunication system, and a telecommunication system.

BACKGROUND

As wireless data transmission will become more common in the future and the number of users will grow, it is essentially important to increase the capacity of systems by improving their performance. A way of enhancing the performance of a radio system is to allocate radio resources using beam forming in the transmission and reception of a base station. Beam forming is typically implemented using antenna arrangements consisting of one or more antenna elements used both in transmission and reception, and by weighting the signals of the antenna elements. The beam patterns resulting from beam forming typically comprise two or more antenna beams, which can further be associated with beam-specific coding. In an ideal case, each beam thus enables a separate physical radio channel, which reduces the multi-user interference that impairs the performance of the radio system.

Allocation of the radio resources to user equipment is typically based on uplink channel measurements carried out by the base station on signals transmitted by the user equipment. Selection of a favourable portion of the cell in the downlink is based on correspondence between the uplink and downlink antenna beam patterns such that each uplink beam has a corresponding downlink counterpart. Therefore, it can be assumed that the best downlink channel can be obtained using the antenna beams that provide the best uplink channel.

However, the correspondence between the downlink and uplink beam patterns causes inflexibility when optimising the downlink and uplink beam structures in terms of overall capacity of the telecommunication system.

BRIEF DESCRIPTIONS OF THE INVENTION

An object of the invention is to provide a method and a telecommunication system which enable a base station to utilize mutually independent downlink and uplink beam patterns. This is achieved by a method of allocating radio resources in a telecommunication system. The telecommunication system includes a base station capable of forming antenna beams. The method includes the steps of transmitting a signal by user equipment and receiving the signal using at least two primary beams in order to provide primary beam-specific signals. The method also includes the step of determining at least two secondary beam-specific variables associated with the at least two secondary beams using the primary beam-specific signals. The method further includes the step of performing a transformation between the primary antenna beams and the secondary antenna beams. The at least one secondary beam is different from any one of the primary beams. The method also includes the step of allocating radio resources to the user equipment based on the secondary beam-specific variables.

The invention also relates to a telecommunication system. The telecommunication system includes a base station and user equipment. The base station includes an antenna array for providing a radio link for signals between the base station and the user equipment. The base station includes beam forming means connected to the antenna array for forming antenna beams. The beam forming means are configured to form at least two primary beams for signal reception using primary antenna weights and the antenna array. The user equipment is configured to transmit a signal. The antenna array and the beam forming means are configured to receive the transmitted signal using at least two primary beams, thus providing primary beam-specific signals as output. The base station includes processing means connected to the beam forming means for determining at least two secondary beam-specific variables associated with two secondary beams using the primary beam-specific signals as input and a transformation between the primary antenna beams and the secondary antenna beams. At least one secondary antenna beam may be different from any one of the primary antenna beams. The telecommunication system further includes allocation means for allocating radio resources to the user equipment based on the secondary beam-specific variables.

Preferred embodiments of the invention are described in the dependent claims.

The method and system of the invention provide several advantages. In a preferred embodiment of the invention, different beam structures can be employed in the downlink and the uplink, thus enabling the overall capacity of the telecommunication system to be increased.

LIST OF THE DRAWINGS

In the following, the invention will be described in greater detail with reference to the preferred embodiments and the accompanying drawings, in which FIG. 1 shows an example of a structure of a telecommunication system;

DESCRIPTION OF EMBODIMENTS

Figure 1:
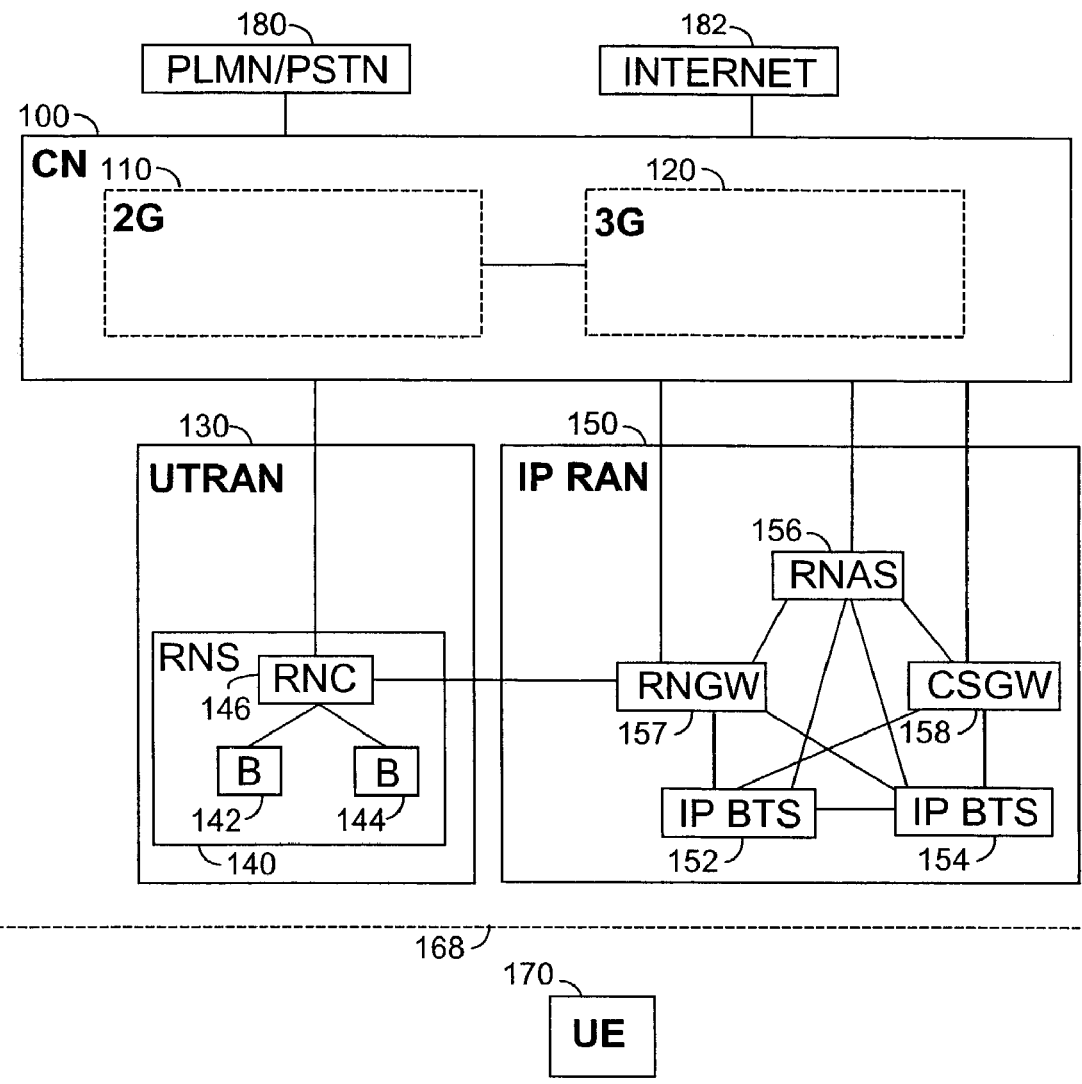

FIG. 1 is a simplified block diagram illustrating the of telecommunication systems on a network element level.

The telecommunication system may include a core network (CN) 100, a radio access network (RAN) 130 and user equipment (UE) 170. A radio access network called UTRAN (UMTS Terrestrial Radio Access Network) 130 belongs to the third generation and is implemented by wideband code division multiple access (WCDMA) technology. FIG. 1 also shows an Internet Protocol Radio Access Network 150 (IP RAN) implemented with WCDMA technology. The invention is not, however, restricted to these radio systems, but can be applied to any radio system that uses beam forming techniques in the radio interface.

The core network 100 may include second generation network elements 110 and third generation network elements 120 connected to the UTRAN 130 and to the Internet Protocol radio access network (IPRAN) 150. The core network 100 may be connected to external networks, such as a Public Land Mobile Network (PLMN), Public Switched Telephone Network (PSTN) 180 or the Internet 182.

The radio access network 130 may include radio network subsystems 140. Each radio network subsystem 140 may include radio network controllers (RNC) 146 and nodes B 142, 144.

The tasks the radio network controller 146 performs may include radio resource management of Node B 142, 144, inter-cell handovers, management of frequency hopping sequences, time delay measurement on the uplink, implementation of the operation and maintenance interface, and power control. The radio network controller 146 also performs selection of the secondary beams when user data is transmitted to the user equipment 170 or received from the user equipment based on secondary beam-specific variables.

Node B 142, 144 may include at least one transceiver for implementing a WDCMA radio interface. The tasks Node B performs may include calculation of timing advance (TA), uplink measurements, channel coding, encryption, decryption, and frequency hopping.

The Internet Protocol Radio Access Network 150 may include a radio network access server (RNAS) 156, a radio network gateway (RNGW) 157, a circuit-switched gateway (CSGW) 158, and at least one Internet protocol base station (IP BTS) 152, 154.

The circuit-switched gateway 158 is a logical element used between the Internet Protocol Radio Access Network 150 and the circuit-switched network elements of the core network 100. The circuit-switched gateway 158 is controlled by the RAN access server 156.

The RAN access server 156 acts as a signalling gateway between the Internet Protocol Radio Access Network 150 and the core network 100.

The RAN gateway 157 is the Internet protocol user plane from the core network 100 or other radio access network 130 to the Internet Protocol Radio Access Network 150.

The IP base station 152, 154 implements the radio interface 168 between the Internet Protocol Radio Access Network 150 and the user equipment 170. The IP base station 152, 154 can be viewed as a small radio network controller connected to the RAN access server 156 and the gateways 157, 158. In the Internet Protocol Radio Access Network 150, most of the functions of the centralized controllers, such as the radio network controller 146, are moved to the IP base station 152, 154.

In this context, node B 142, 144 and the IP base station 152, 154 and the corresponding network elements of other relevant radio systems will be called a base station unless otherwise indicated.

In this context, the network controller 146 and other elements performing similar tasks will be called a base station controller unless otherwise indicated. The network controller may be located in the base station the network controller controls.

The user equipment 170 includes at least one transceiver for establishing a radio interface 168 to the radio access network 130 or the Internet Protocol Radio Access Network 150. The user equipment 170 further comprises an antenna, a user interface and a battery. The user equipment 170 is also called a terminal, a mobile station, a subscriber terminal and a mobile telephone.

Figure 2:
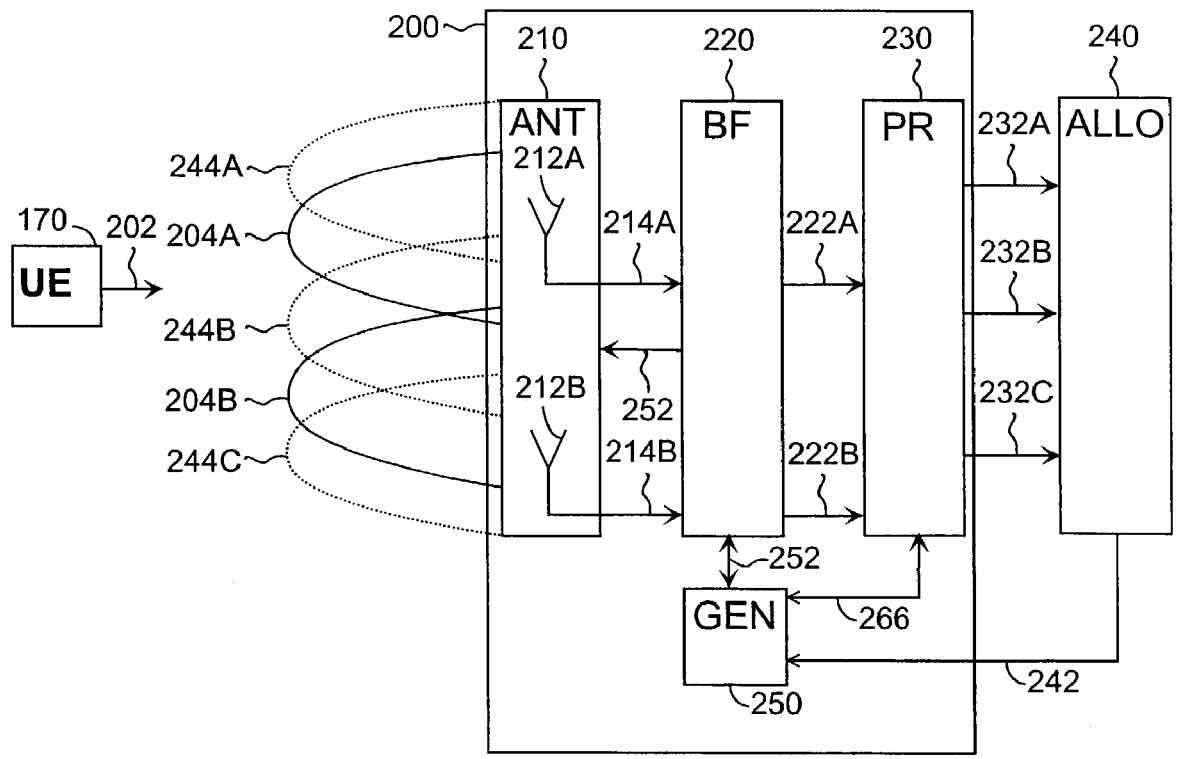
FIG. 2 shows another example of a structure of a telecommunication system.

FIG. 2 illustrates an example of a telecommunication system according to the present invention. The FIG. 2 shows user equipment 170 configured to transmit a signal 202. Signal 202 may be transmitted periodically or whenever the quality of the radio channel between the user equipment 170 and the base station 200 exceeds a given threshold. The signal 202 may include a predetermined symbol sequence known by the base station 200, with which symbol sequence the base station 200 is capable of determining the beam-specific variables that characterize the radio channel between the base station 200 and the user equipment 170. The signal 202 can be a pilot signal. In general, a pilot signal refers to a known reference signal that may be a part of a transmitted user signal. In a telecommunication system according to the Third Generation Partnership Project (3GPP) specification, the pilot signal 202 can be transmitted in every time slot and it can be a part of a Random Access Channel (RACH), for example. The secondary beam-specific variables can, for example, be one of the following: an estimate of the channel impulse response, averaged estimate of the channel impulse response, or an estimate of the following parameters: wide band power, narrow band power, signal-to-noise ratio, signal-to-interference ratio, and signal-to-interference-and-noise ratio.

The telecommunication system may include a base station 200 equipped with an antenna array 210 for proving a radio link 168 for signals between the base station 200 and the user equipment 170. The base station 200 further may include beam forming means 220 connected to the antenna array 210 for forming primary antenna beams 204A, 204B. In a preferred embodiment of the invention, the primary antenna beams 204A, 204B may be fixed beams. The primary antenna beams 204A, 204B may be orthogonal or non-orthogonal.

The beam forming means 220 are configured to form at least two primary antenna beams 204A, 204B for signal reception using primary antenna weights. In an embodiment of the invention, the secondary beams 244A, 244B, 244C are virtual antenna beams, i.e. the secondary beams 244A, 244B, 244C are known, but they are not utilized as such for signal transmission or reception. With the virtual secondary beams 244A, 244B, 244C, more accurate variables, such as channel estimates, are obtained when the signal 202 originates from an unfavourable direction with respect to the primary antenna beams 204A, 204B. In other terms, the angular resolution of the direction of arrival of the signal 202 improves when the virtual secondary beams 244A, 244B, 244C are used. The secondary beam-specific variables 232A, 232B, 232C determined for the virtual secondary beams 244A, 244B, 244C can be used in allocating the radio resources when a third beam pattern is used. The third beam pattern can be, for example, a downlink beam pattern using a different carrier frequency from that used in the uplink primary antenna beams 204A, 204B. In such a case, it is preferable to know the transformation between the third antenna beam structure and the secondary antenna beam structure so that the direction of arrival of the signal 202 remains in the transformation between the beam patterns, and the allocation of the radio resources can be directed at the desired direction. In this case, the beam forming means 220 may be configured to form the third antenna beam pattern, the processing means may be configured to carry out the transformation between the secondary antenna beams 244A, 244B, 244C and the third antenna beam structure, and the allocation means 240 may be configured to allocate the radio resources using the third antenna beam structure and the secondary beam-specific variables.

In a preferred embodiment of the invention, the beam forming means 220 may be configured to form at least one secondary beam 244A, 244B, 244C. The secondary beams 244A, 244B, 244C can be used in signal transmission or signal reception. In such a case, the virtual secondary beams 244A, 244B, 244C may coincide with the third antenna beam structure mentioned above.

The primary beams 204A, 204B constitute a primary radiation pattern illustrated with solid lines in FIG. 2, and the secondary beams 244A, 244B, 244C constitute a secondary radiation pattern illustrated with dotted lines in FIG. 2. According to the invention, at least one of the secondary beams 244A, 244B, 244C may be different from any one of the primary beams 204A, 204B. In a preferred embodiment of the invention, the primary radiation pattern and the secondary radiation pattern have been optimised independently, for example, based on the prevailing requirements of the telecommunication system. This is particularly the case when the primary radiation pattern is used in the uplink for signal reception and the secondary radiation pattern is used in the downlink for signal transmission. It must be noted that in FDD (Frequency Division Duplex) systems, the uplink carrier frequency differs from that of the downlink. Therefore, different beam forming weights may be applied in the uplink and in the downlink. It may be assumed that the number of beams and their main direction in the uplink and downlink are the same. However, this may be a non-optimal solution because in the downlink, the user equipment 170 may appear in direction between two main beams. The beam gain in a non-optimal case may drop more than 3 dB compared to the case where the user equipment 170 is in main beam direction. The dips between the main beams are unavoidable if the number of beams equals the number of antenna elements 212A, 212B in the antenna array 210. It is thus usually beneficial to have larger number of beams in the downlink than the number of antenna elements 212A, 212B in the antenna array 210. In the uplink, signals are combined over the beams and there is no need to have a greater number of beams than the number of antenna elements 212A, 212B. However, it is often required that the direction of the user equipment 170 is estimated from the uplink signal transmitted by the user equipment 170, which may lead to the conclusion that the direction-of arrival-estimation matches the beam directions used in the downlink. In the 3GPP specification, for RRM (Radio Resource Management) measurements of WCDMA, wideband power measurements may be performed for each beam in the uplink and the downlink. In addition, Node B may report the beam index of each user equipment 170 corresponding to the best Signal-to-Interference Ratio (SIR). Inherently, this reporting requirement means that the number of beams and their directions being measured may match in the uplink and downlink. In short, it can be stated that the number of the uplink beams may be different for RRM measurements and for user signal reception. The characteristics which can distinguish between the primary beams 204A, 204B and the secondary beams 244A, 244B, 244C include: azimuth angle (horizontal direction), elevation angle (vertical direction), polarization, gain, beam shaping, and antenna configuration (number of antenna elements in the antenna array 210). On a general level, the difference can be defined from the point of view of the radio channels obtained with the two radiation patterns. For example, the radio channels can be considered different if a set of beam-specific channel estimates is incapable of characterizing both primary and secondary beams without further manipulation, such as combination, of the channel estimates of the other. In this context, the concept of a reception antenna beam is used to describe the spatial sampling of an electromagnetic wave front when receiving a signal transmitted by the user equipment 170. For the ease of description, the reception antenna beams are discussed in terms of terminology used in association with the transmission antenna beams. The antenna weights are typically complex variables that multiply the signals received by an antenna array 210 to form reception antenna beams. In transmission, the antenna weights may be used to multiply signals directed at the antenna array 210 to allocate the signals in a desired direction in space. The beam forming means 220 can be implemented digitally with software in a digital signal processor in the base band parts of the base station 200 or by utilizing application-specific integrated circuits (ASIC) typically designed specifically for such a purpose. Also, the beam forming means 220 can be implemented in analog signal domain using a phase-shift network. The antenna weights employed by the beam forming means 220 can be obtained from the base station control unit that controls the base station 200 or from the network controller 146.

The antenna weights can be expressed using a matrix representation. The primary antenna weights can be expressed with a primary antenna weight matrix $V_P$ as $$V_P = \begin{pmatrix} v^P_{11} & v^P_{12} & \Lambda & v^P_{1M} \\ v^P_{21} & v^P_{22} & \Lambda & v^P_{2M} \\ M & M & O & M \\ v^P_{K1} & v^P_{K2} & \Lambda & v^P_{KM} \end{pmatrix}, \quad (1)$$

wherein the elements $v_{km}^P$ are complex numbers. Each element $v_{km}^P$ expresses the relationship between a primary beam m and an antenna element k. The number of antenna elements is K, and the number of primary beams 204A, 204B is M. The primary beams 204A, 204B can be arranged, for example, using well-known beam forming weights, such as a Butler matrix. The Butler matrix produces orthogonal beams optimal from the viewpoint of uplink diversity combining.

The secondary antenna weights can be expressed with a secondary antenna weight matrix VS as $$V_S = \begin{pmatrix} v^S_{11} & v^S_{12} & \Lambda & v^S_{1N} \\ v^S_{21} & v^S_{22} & \Lambda & v^S_{2N} \\ M & M & O & M \\ v^S_{K1} & v^S_{K2} & \Lambda & v^S_{KN} \end{pmatrix}, \quad (2)$$

wherein the elements $v_{kn}^P$ are complex numbers. Each element $v_{kn}^P$ expresses the relationship between the secondary beam n and an antenna element k. The number of antenna elements is K, and the number of secondary beams 244A, 244B, 244C is N.

The base station 200 may further include processing means 230 connected to the beam forming means 220 for determining at least two secondary beam-specific variables 232A, 232B, 232C using the signal 202 transmitted by the user equipment 170 and the primary beam-specific signals 214A, 214B formed from the signal 202. The secondary beam-specific variables 232A, 232B, 232C may characterize the radio channel if the signal 202 is received using the secondary beams 244A, 244B, 244C. The secondary beam-specific variable 232A, 232B, 232C is, for example, a beam-specific impulse response or an approximation of the impulse response. The primary beam-specific signals 214A, 214B can be represented as a beam-specific signal vector as $$S_P = (s_1^P, \ldots, s_m^P, \ldots, s_M^P), \quad (3)$$

wherein each component $s_m^P$ represents a signal received by a primary antenna beam m. The secondary beam-specific variables 232A, 232B can be presented as a beam-specific variable vector as $$H_S = (h_1^S, \ldots, h_n^S, \ldots, h_N^S), \quad (4)$$

wherein each component $h_n^S$ represents a variable for a secondary beam n.

The transformation between the primary antenna beams 204A, 204B and the secondary antenna beams 244A, 244B, 244C can be represented in a matrix form as $$W_T = \begin{pmatrix} w_{11} & w_{12} & \Lambda & w_{1M} \\ w_{21} & w_{22} & \Lambda & M \\ M & M & O & M \\ w_{N1} & \Lambda & \Lambda & w_{NM} \end{pmatrix}, \quad (5)$$

wherein the transformation weights $w_{nm}$ are complex numbers. The secondary beam-specific variable vector can be expressed as $$H_S = W_T F(S_P), \quad (6)$$

wherein the function F typically preserves the matrix form of the information conveyed by the primary beam-specific signal vector representing signal processing, such as a channel estimation, directed at the primary beam-specific signals. In a preferred embodiment of the invention, the transformation between the primary antenna beams 204A, 204B and the secondary antenna beams 244A, 244B, 244C is carried out in a truncated form, wherein only the primary antenna beams 204A, 204B nearest to the secondary antenna beam 244A, 244B, 244C are used in determining the secondary beam-specific variable for the secondary beam 244A, 244B, 244C.

In an embodiment of the invention, the complex weights $w_{nm}$ may be determined in advance and they account for at least one factor in the following group: primary antenna weights, antenna geometry, carrier frequency associated with the primary beams 204A, 204B, and carrier frequency associated with the secondary beams 244A, 244B, 244C. The weights $w_{nm}$ can be formed with numerical simulations.

In an embodiment of the invention, the transformation between the primary antenna beams 204A, 204B and the secondary antenna beams 244A, 244C, 244C can be obtained using the primary beam antenna weights and the secondary beam antenna weights. In a mathematical notation, the transformation matrix WT given in Equation (7) can be expressed with the primary antenna weight matrix VP and the secondary antenna weight matrix in the following manner:

$$W_T = V_P^{-1} V_S, \quad (7)$$

wherein $V_P^{-1}$ is an inverse matrix of matrix $V_P$.

For the direction-of-arrival estimation, channel estimates from primary beams 204A, 204B can be applied in the above-mentioned manner to obtain the corresponding estimates for the secondary beams 244A, 244B, 244C. Similarly, wide band or narrow band power estimates from the primary beams 204A, 204B can be transformed into the corresponding estimates for the secondary beams 244A, 244B, 244C. This kind of matrix vector calculation can be rather cumbersome since it has to be applied to each user equipment 170. Since the desired user signal in typical macro cell environments is significant only in one or two primary beams 204A, 204B, it may suffice to transform only the two strongest primary beam signals to obtain a reliable channel or power estimate for any direction between the two primary beams 204A, 204B. Thus, for each user equipment 170, it may suffice that the channel or power estimate for a particular secondary beam direction is calculated by using only two complex multiplications and a sum. This operation corresponds to the aforementioned linear transformation from the primary beam domain to the secondary beam domain in a truncated manner. Due to the fixed antenna geometry and primary beam weights, the complex weights for the secondary beams 244A, 244B, 244C can be calculated in advance. The transformation weights can be stored in the base station controller of the base station 200, or in the network controller 146. If the telecommunication system supports several primary radiation patterns and several secondary radiation patterns, a separate transformation may be required for each pair of radiation patterns.

In an embodiment of the invention, primary variables, denoted with q(m) and q(m+1), may be estimated for two adjacent primary beams m, m+1 corresponding to two adjacent primary beam directions DoA(m) and DoA(m+1), respectively. A variable q(n) can be evaluated from any direction DoA(n) between directions DoA(m) and DoA(m+1) by two complex multiplications and a sum in the following manner:

$$q(n) = c_1 q(m) + c_2 q(m+1), \quad (8)$$

wherein $c_1$ and $c_2$ represent complex weights. Weights $c_1$ and $c_2$ can be optimized and calculated in advance, taking into account the antenna array geometry and the primary beam forming weights. These weights can also be found in advance by a numerical search in which the quality of the variable estimation in the desired direction DoA(n) is maximized. The quality can be optimised in terms of, for example, secondary beam direction and beam width, and mutual coupling between the secondary beams 244A, 244B, 244C and the side lobe level of the secondary beams 244A, 244B, 244C.

The telecommunication system further comprises allocation means 240 for allocating radio resources using at least one secondary beam 244A, 244B, 244C based on the secondary beam-specific variables 232A, 232B, 232C, such as beam specific impulse response for the secondary beams 244A, 244B, 244C. The tasks allocation of the radio resources may include comparing the secondary beam-specific signal quality variables, such as SIR (Signal-to-Interference Ratio), SINR (Signal-to-Interference/Noise Ratio) or other relevant variables characterizing the signal quality of a secondary beam 244A, 244B, 244C and selecting the most favourable secondary beam 244A, 244B, 244C for radio resource allocation. In radio resource allocation, a user signal is either transmitted or received using the at least one secondary beam 244A, 244B, 244C. The user signal may include user-specific coding and beam-specific coding, such as a scrambling code. The user signal can also include a pilot signal. The allocation means 240 can be implemented as software application in the base station 200, in the base station controller 146, or in the upper layers of the telecommunication system.

Figure 7:
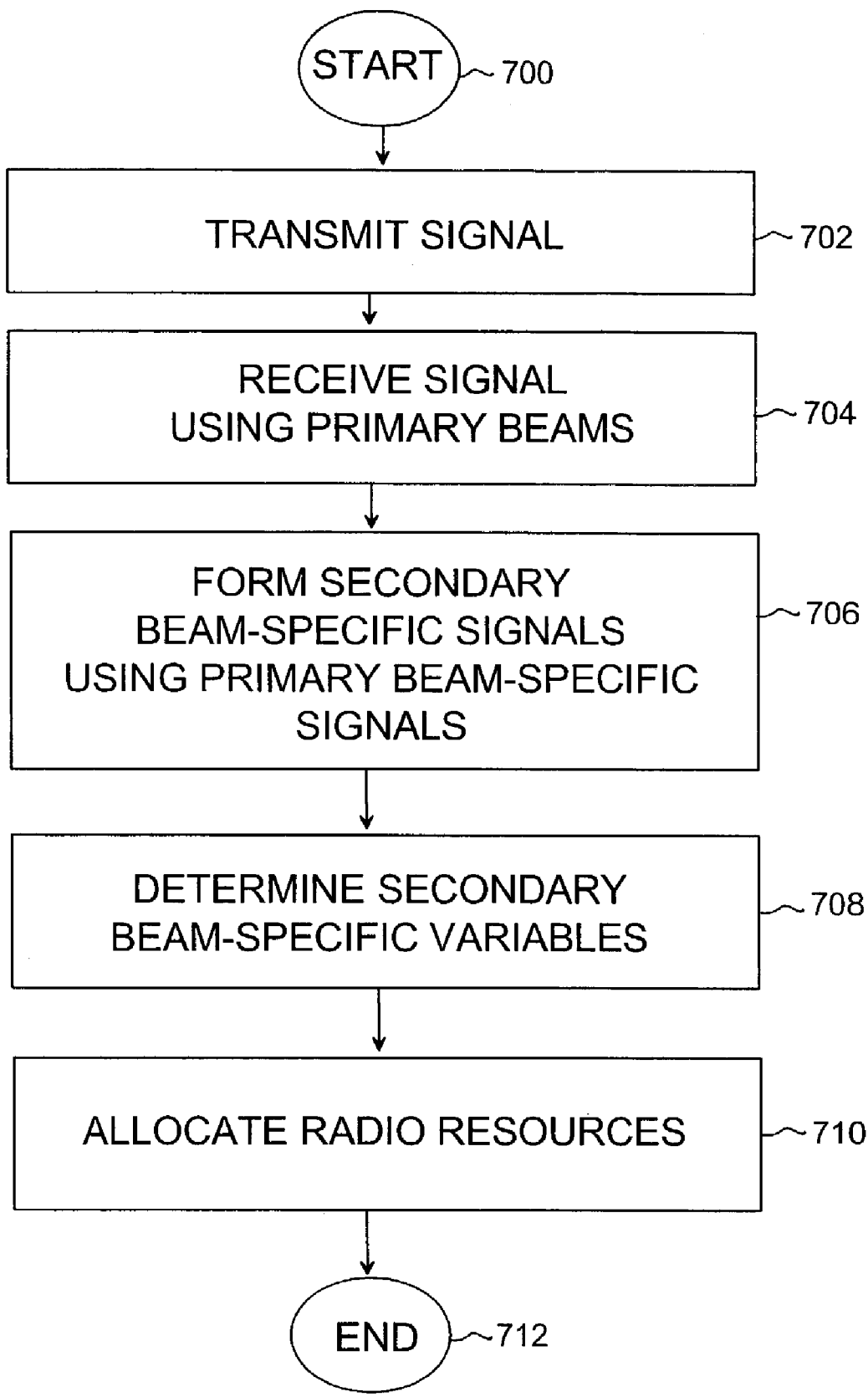
FIG. 7 is a flow chart illustrating a second preferred embodiment of the invention.

With reference to the flow chart shown in FIG. 7, the method starts in Start Block 700. In block 702, the signal 202 is transmitted from the user equipment 170. In block 704, the transmitted signal 202 is received using at least two primary beams 204A, 204B, thus providing the primary beam-specific signals 222A, 222B as output for the processing means 230. In block 708, at least two secondary beam-specific variables 232A, 232B, 232C are determined by the processing means 230, using the primary beam-specific signals and the transformation between the primary antenna beams 204A, 204B and the secondary antenna beams 244A, 244B, 244C. In block 710, the radio resources are allocated to the user equipment 170 based on the secondary beam-specific variables. In block 712, the method ends.

Figure 6:
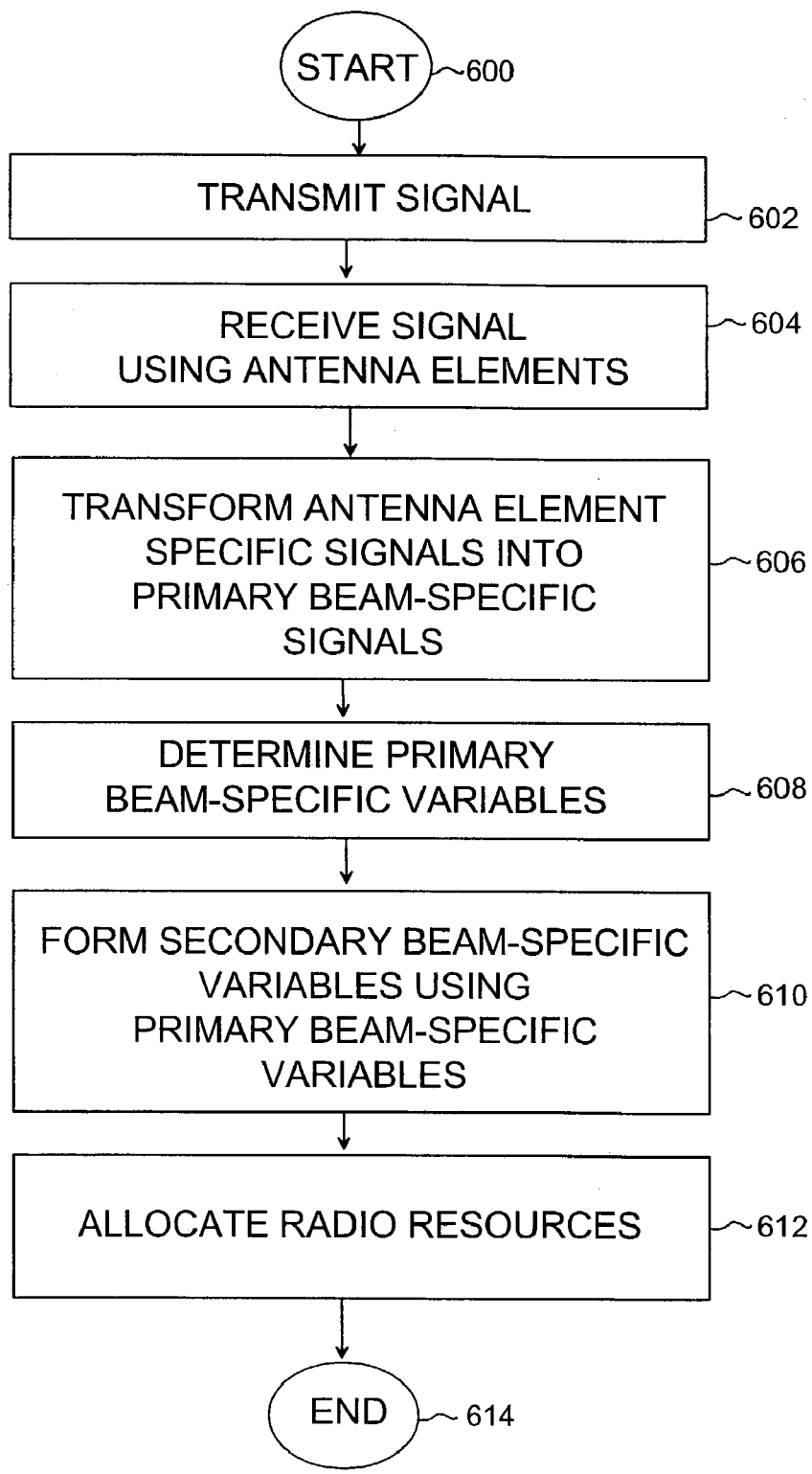
FIG. 6 is a flow chart illustrating a preferred embodiment of the invention.

With reference to the flow chart shown in FIG. 6, according to a preferred embodiment of the invention, the signal 202 is received 604 using at least two antenna elements 212A, 212B in an antenna array 210, thus providing primary antenna-element-specific signals 214A, 214B as output for the beam forming means 220. Steps 600 and 602 correspond to steps 700 and 702, respectively shown in FIG. 7. The antenna elements 212A, 212B can be arranged, for example, in the form of a uniform linear array (ULA) or in another configuration known to a person skilled in the art. After reception, the primary antenna-element-specific signals 214A, 214B are delivered to the beam forming means 220 and transformed 606 into primary beam-specific signals 222A, 222B, using primary antenna weights associated with the primary beams 222A, 222B.

Figure 3:
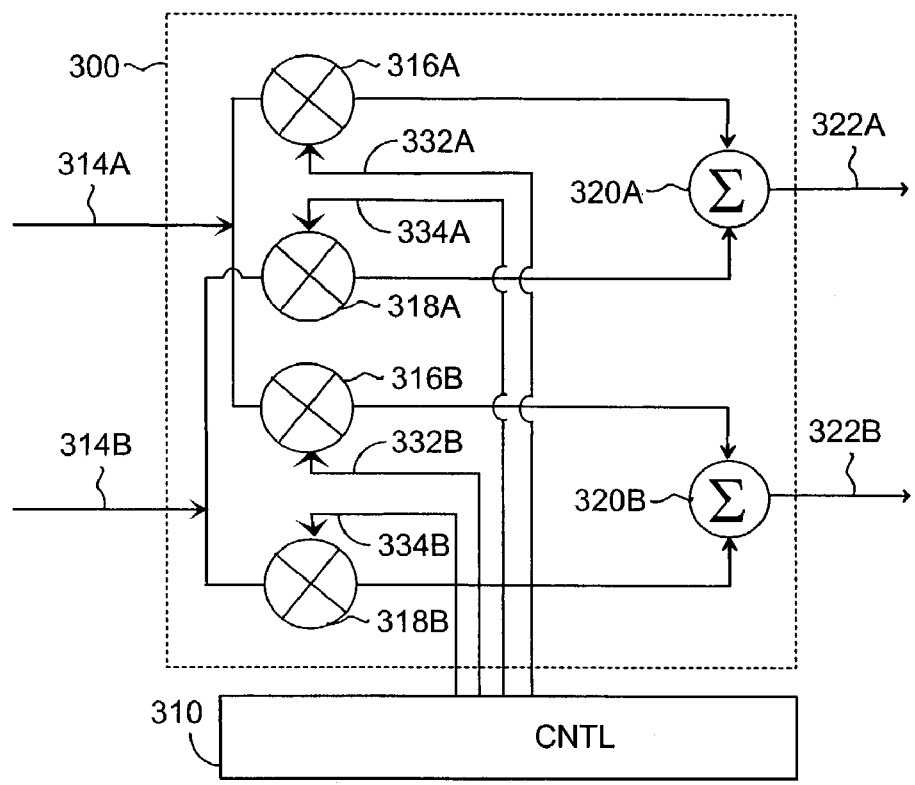
FIG. 3 shows an example of a structure of weighting means.

FIG. 3 provides an example of the beam forming means 300 and the transformation between the antenna-element-specific signals 314A, 314B and the primary beam-specific signals 314A, 314B in greater detail. In a preferred embodiment of the invention, the antenna-element-specific signals 314A, 314B are multiplied by primary complex antenna weights 332A, 334A, 332B, 334B in complex multipliers 316A, 318A, 316B, 318B. Next, the weighted signals are summed up in summers 320A, 320B, thus forming the primary beam-specific signals 322A, 322B. The multiplication can be performed using, for example, the digital IQ-multiplication method known to a person skilled in the art. In a preferred embodiment of the invention, the primary antenna weights 332A, 334A, 332B, 334B are stored in the control unit 310 of the base station 200, and downloaded to the beam forming means 300 when necessary. The beam forming means 300 is usually called a digital beam matrix. In a general case, the number of antenna elements is K. The K antenna elements are capable of producing K orthogonal beams. With reference to FIG. 3, the general case of transforming K antenna-element-specific signals into K primary beam-specific signals, such as pilot signals, can be implemented in a straightforward manner know to a person skilled in the art. Also, the implementation of the beam forming means 300 in a non-orthogonal case, i.e. when the number of antenna elements 212A, 212B does not equal the number of the primary antenna beams 204A, 204B, or the beam directions differ from the orthogonal beam directions, is known to a person skilled in the art.

Figure 4:
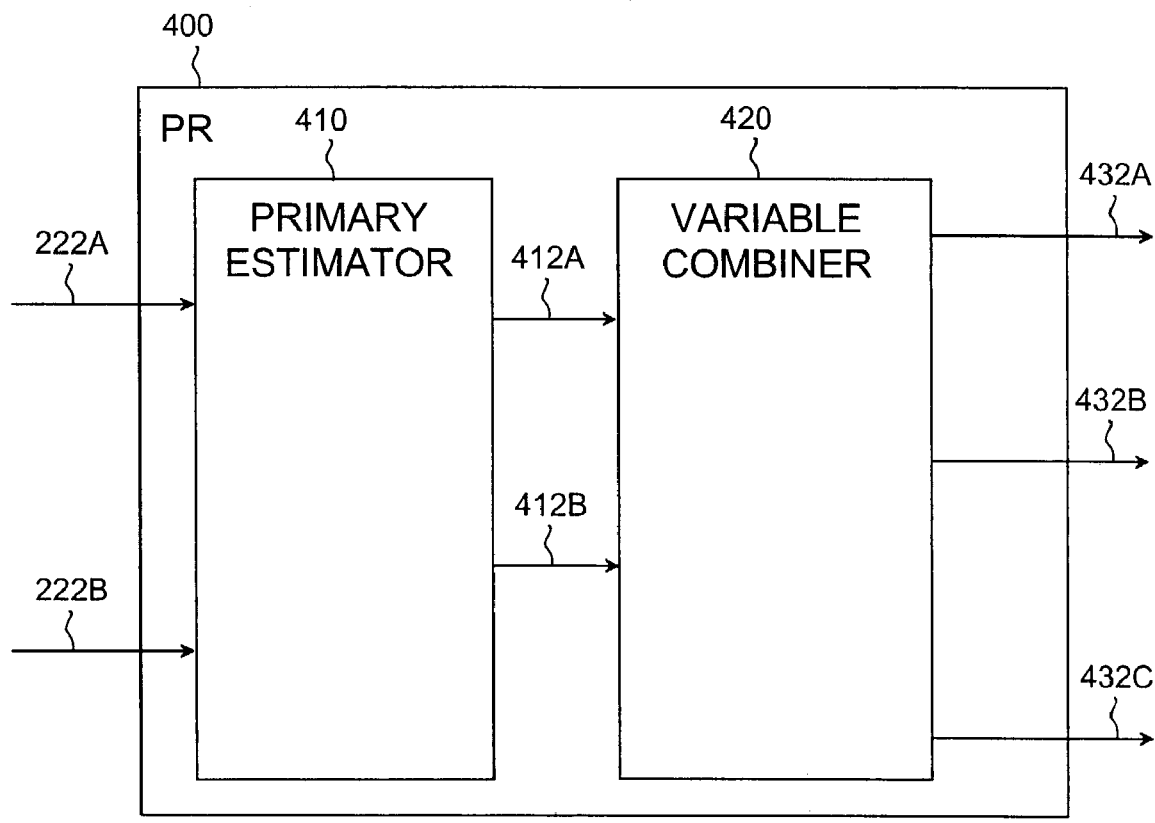
FIG. 4 shows an example of a structure of processing means.

With further reference to the flow chart and processing means 400 shown in FIGS. 6 and 4, respectively, according to a preferred embodiment of the invention, at least two primary beam-specific variables 432A, 432B, 432C are determined 608 using the primary beam-specific signals 412A, 412B, and the secondary beam-specific variables 432A, 432B, 432C are formed 610 using the primary beam-specific variables 412A, 412B and the transformation between the primary antenna beams 204A, 204B and the secondary antenna beams 244A, 244B, 244C. The primary beam specific variables 412A, 412B can be written in a vector form as $$H_P = (h_1^P, \ldots, h_m^P, \ldots, h_M^P), \tag{9}$$

wherein $h_m^P$ represents a primary beam-specific variable for a primary beam m, the number of the primary beams 204A, 204B being M. The primary beam-specific variables can, for example, be estimated values of the following quantities: a channel impulse response, an averaged channel impulse, a wide band power, a narrow band power, a signal-to-noise ratio, a signal-to-interference ratio, and a signal-to-interference-and-noise ratio. The matrix representation of the secondary beam-specific variables $H_S$ can now be written as $$H_S = W_T H_P. \tag{10}$$

With further reference to FIG. 6, in Block 612, the radio resources are allocated according to the invention. In block 614, the method ends.

FIG. 4 shows the processing means 400 configured to determine at least two primary beam-specific variables 412A, 412B using the primary beam-specific signals 222A, 222B, and the processing means 400 are configured to form the secondary beam-specific variables 432A, 432B, 432C using the primary beam-specific variables 412A, 412B and the transformation between the primary antenna beams 204A, 204B and the secondary antenna beams 244A, 244B, 244C. In this embodiment, the processing means 400 comprise a primary estimator 410 for determining the primary beam specific variables 412A, 412B, such as an impulse response, for at least two primary antenna beams 204A, 204B. The tasks the primary estimator 410 performs may include: estimating the delays between the multi-path components of the primary beam-specific signals 222A, 222B, forming the channel taps of each RAKE finger, and combining the channel taps of each RAKE finger. The primary estimator 410 can be implemented as a software application in digital signal processor of the base band parts of the base station 200. The details of channel estimation are assumed to be known to a person skilled in the art. The processing means 400 also may include a variable combiner 420 for forming the secondary beam-specific variables 432A, 432B, 432C using the primary beam-specific variables 412A, 412B as input and the transformation between the primary antenna beams 204A, 204B and the secondary antenna beams 244A, 244B, 244C.

The principles of the variable combiner 420 by means of the signal chart are shown in FIG. 3. In this embodiment, the primary beam-specific variables 314A, 314B are multiplied in the complex multipliers 312A, 314A, 312B, 314B by the complex transformation weights 332A, 334A, 332B, 334B and the weighted variables are summed in the summers 320A, 320B. The variable combiner 420 can be implemented as a software application in the digital signal processor of the base band part of the base station 200. The resulting secondary beam-specific variables 432A, 432B can be further subjected to averaging procedures, wherein the averaging can be performed over a certain time period. The averaging procedures may also be applied to the primary beam-specific variables 412A, 412B.

Figure 5:
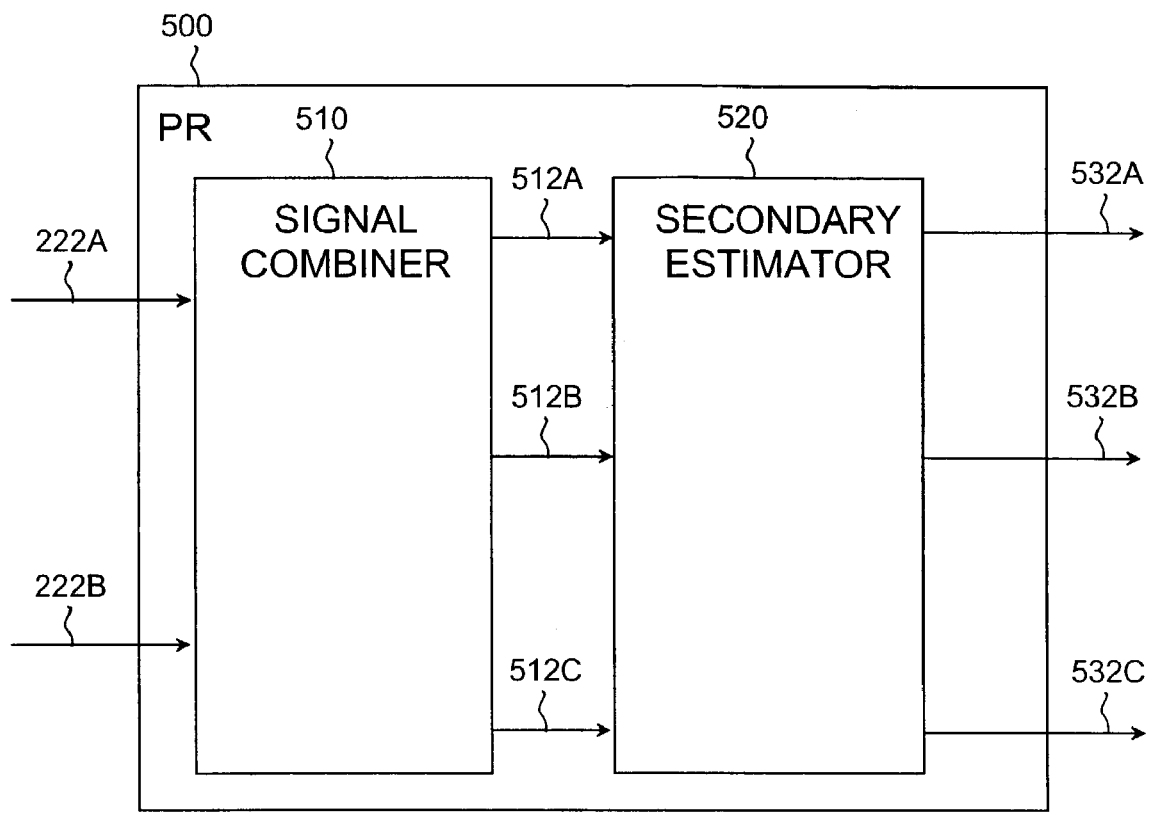
FIG. 5 shows another example of a structure of the processing means

With reference to FIGS. 5 and 7, according to a preferred embodiment of the invention, FIG. 5 shows processing means 500 configured to form secondary beam-specific signals 512A, 512B, 512C associated with secondary beams 244A, 244B, 244C using the primary beam-specific signals 222A, 222B and the transformation between the primary antenna beams 204A, 204B and the secondary antenna beams 244A, 244B, 244C. The processing means 500 are configured to determine the secondary beam-specific variables 532A, 532B, 532C using the secondary beam-specific signals 512A, 512B, 512C. The steps according to this embodiment may include: forming 706 secondary beam-specific signals 512A, 512B, 512C associated with secondary beams 244A, 244B, 244C using the primary beam-specific signals 222A, 222B and the transformation between the primary antenna beams 204A, 204B and the secondary antenna beams 244A, 244B, 244C; and determining 708 the secondary beam-specific variables 532A, 532B, 532C using the secondary beam-specific signals 512A, 512B, 512C. The processing means 500 may include a signal combiner 510 for forming the secondary beam-specific signals 512A, 512B, 512C using the primary beam-specific signals 222A, 222B as input. The principles of the combiner 510 can be described by means of the signal chart shown in FIG. 3. The primary beam-specific signals 222A, 222B may be used as input signals 314A, 314A, which are multiplied by the transformation weights 332A, 334A, 332B, 334B that carry out the transformation between the primary antenna beams 204A, 204B and the secondary antenna beams 244A, 244B, 244C in complex multipliers 316A, 318A, 316B, 318B. Next, the weighted signals may be summed in summers 320A, 320B, which provide the secondary beam-specific signals 512A, 512B, 512C as output. The processing means 500 may also include a secondary estimator 520, which uses the secondary beam-specific signals 512A, 512B, 512C provided by the signal combiner 510 as input. The secondary estimator 520 determines the secondary beam-specific variables 532A, 532B, 532C, such as averaged impulse response corresponding to the secondary beams 244A, 244B, 244C. The tasks the secondary estimator 530 performs may include: estimating the best secondary beam 244A, 244B, 244C taking into account the multi-path components of the secondary beam-specific signals, combining channel estimates of relevant RAKE fingers. Thus, only symbol level processing may be needed for the parameters corresponding to the secondary beam directions. The secondary estimator 520 can be implemented as a software application in the digital signal processor of the base band parts of the base station 200. The details in the channel estimation are known to a person skilled in the art.

Figure 8:
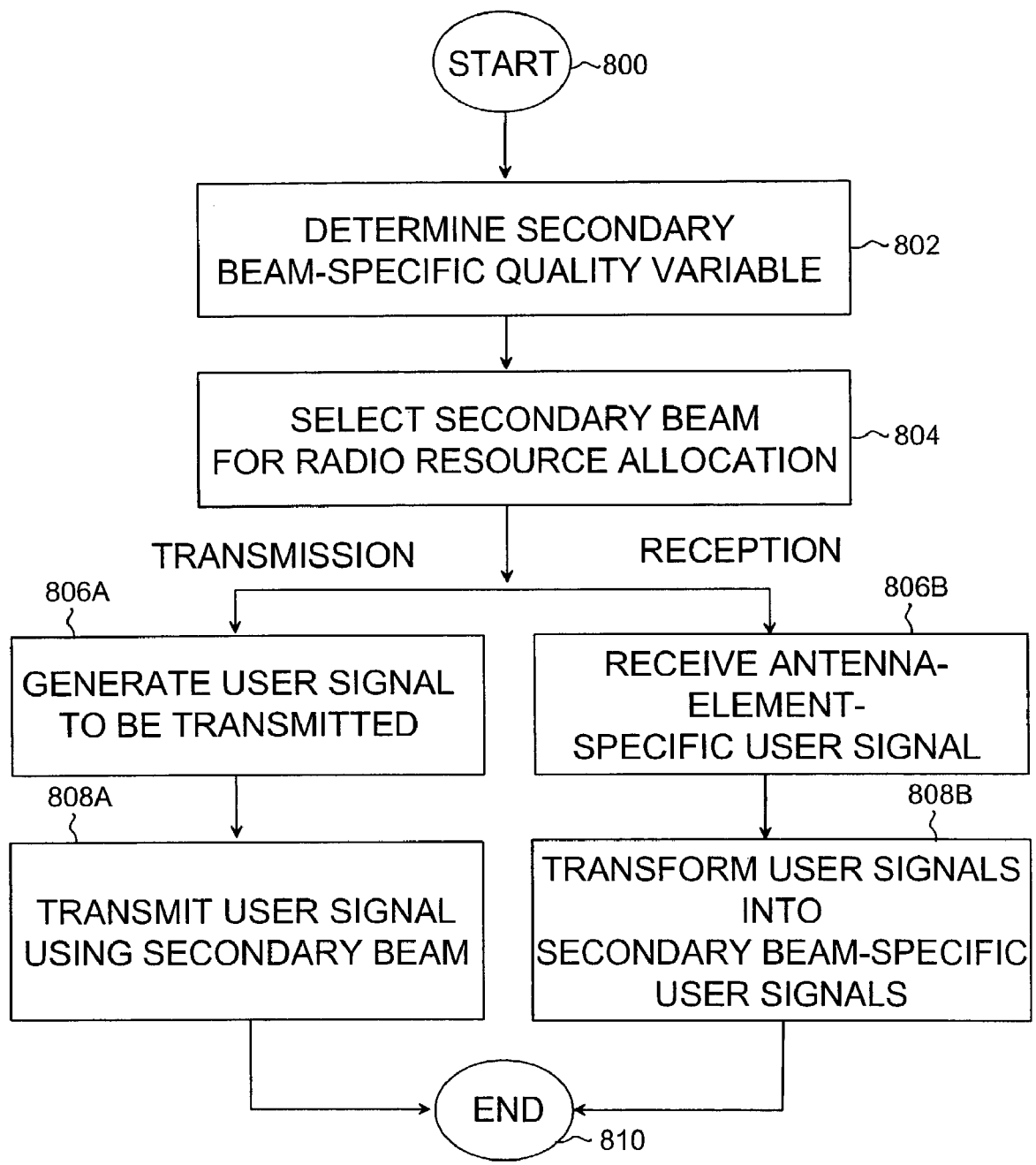
FIG. 8 is a flow chart illustrating a preferred embodiment of allocating radio resources.

With reference to the flow chart given in FIG. 8, an embodiment associated with allocation of radio resources is shown. The Start block 800 can be situated in blocks 610 and 710 shown in FIGS. 6 and 7, respectively.

In a preferred embodiment of the invention, the beam forming means 220 may be configured to form at least one secondary beam 244A, 244B, 244C, and the allocation means 240 are configured to allocate the radio resources using the secondary beam 244A, 244B, 244C. In a preferred embodiment of the invention, the processing means 230 may be configured to determine at least two secondary beam-specific quality variables, and the allocation means 240 may be configured to select at least one secondary beam 244A, 244B, 244C for radio resource allocation based on the secondary beam-specific quality variables. With reference to FIG. 8, at least two secondary beam-specific quality variables may be determined 802 before allocating the radio resources, and next the radio resources may be allocated by selecting 804 at least one secondary beam 244A, 244B, 244C for radio resource allocation based on the secondary beam-specific quality variables. The secondary beam-specific quality variables may characterize the quality of the secondary beams 244A, 244B, 244C, when the signal 202 is received by them. The secondary beam-specific quality variables may be SIR-values, for example, of each secondary beam 244A, 244B, 244C using the primary beam-specific signals 222A, 222B. In an embodiment of the invention, the secondary beam-specific quality variables may be determined using primary beam-specific signals 222A, 222B such that primary beam-specific quality variables, such as SIR-values, are first determined in the primary estimator 410, and then transformed to secondary beam-specific quality variables in the variable combiner 420. In another embodiment of the invention, the primary beam-specific signals 222A, 222B may be transformed into secondary beam-specific signals 512A, 512B, 512C in the signal combiner 510 and next, the secondary beam-specific quality variables may be formed in the secondary estimator 520. The signal quality variables can be determined using methods known to a person skilled in the art.

In a preferred embodiment of the invention, the selection 804 of the secondary beam 244A, 244B, 244C for the radio resource allocation can be based on the secondary beam-specific variables 432A, 432B, 432C. The selection 804 can be performed as a software application in the base station 200, in the base station controller 146, or in the upper layers of the telecommunication system. In an embodiment of the invention, the secondary beam 244A, 244B, 244C with the best signal quality indicated by the secondary beam-specific quality variable may be chosen as a beam for the radio resource allocation.

In an embodiment of the invention, the direction of arrival of the signal 202 received by the primary beams 204A, 204B may be estimated using secondary beam-specific variables 232A, 232B, 232C, and the radio resources may be allocated to the estimated direction. The direction of arrival can be estimated in the processing means 230 with a software application, and the radio resource allocation can be carried out in the allocation means 240.

With reference to FIG. 2, the base station 200 may include a user signal generator 250 for generating a user signal 252 to be transmitted to the user equipment 170 using at least one secondary beam 244A, 244B, 244C. Furthermore, the beam forming means 220 connected to the user signal generator 250 may be configured to transmit the user signal 252 to the user equipment 170 in the secondary antenna beam 244A, 244B, 244C by weighting the user signal 252 with the antenna weights associated with the directions of the secondary antenna beam 244A, 244B, 244C. With reference to the flow chart shown in FIG. 8, the method may include a step of generating 806A at least one user signal 252 to be transmitted to the user equipment 170. Next, the user signal 252 is transmitted 808A to the user equipment 170 using the secondary antenna beam 244A, 244B, 244C by weighting the user signal 252 with complex antenna weights which are adjusted to downlink carrier frequency and which determine the secondary antenna beam directions. It is noted that downlink beam forming can be achieved at base band by freely weighting the user specific antenna signals. Thus, in the downlink, it is possible to apply any number of beams with different directions independently of the uplink beams. The user signal 252 may include user-specific coding and secondary beam-specific coding, such as a scrambling code. The user signal 252 may include predetermined symbols for channel estimation to be carried out by the user equipment 170. The user signal generator 250 may perform, for example, downlink bit processing, such as coding, and may direct the user signal 252 to the suitable secondary beam 244A, 244B, 244C using information 242 provided by the allocation means 240. The user signal generator 250 may also exchange information 266, such as information on the primary and secondary antenna weights and the transformation between the primary antenna beams 204A, 204B and the secondary antenna beams 244A, 244B, 244C, with the processing means 230. The beam forming means 220 may be connected to the antenna array 210 for providing the antenna user signals 262 to the antenna array 210 to be transmitted using the secondary beams 244A, 244B, 244C. The method is completed in block 810.

In an embodiment of the invention, the secondary beams 244A, 244B, 244C may be used in reception. In this embodiment, the antenna array 210 may be configured to receive 806B an uplink user signal 202 from the user equipment 170 using at least two antenna elements 212A, 212B of the antenna array 210, thus providing primary antenna-element-specific user signals 214A, 214B as output, and the beam forming means 220 and the processing means 230 may be configured to transform 808B the antenna-element-specific user signals 214A, 214B into at least one secondary uplink beam-specific user signal 232A, 232B, 232C using the secondary antenna weights associated with the secondary antenna beam 232A, 232B, 232C and the secondary beam-specific variable. In this embodiment, the channel estimation may be originally carried out with the primary beams 204A, 204B, but the actual reception may be carried out with the secondary beams 244A, 244B, 244C, and the actual reception may utilize the secondary channel estimates transformed from the primary channel estimates. The method is completed in block 810.

In an embodiment of the present invention, the allocation of the radio resources may be adapted to the prevailing requirements of the telecommunication system. The adaptation may include, for example, employing a suitable number of secondary beams 244A, 244B, 244C according to the prevailing downlink capacity requirement. The adaptation can also be performed according to a certain schedule, which follows the load of the base station 200 as a function of time.

Figure 9:
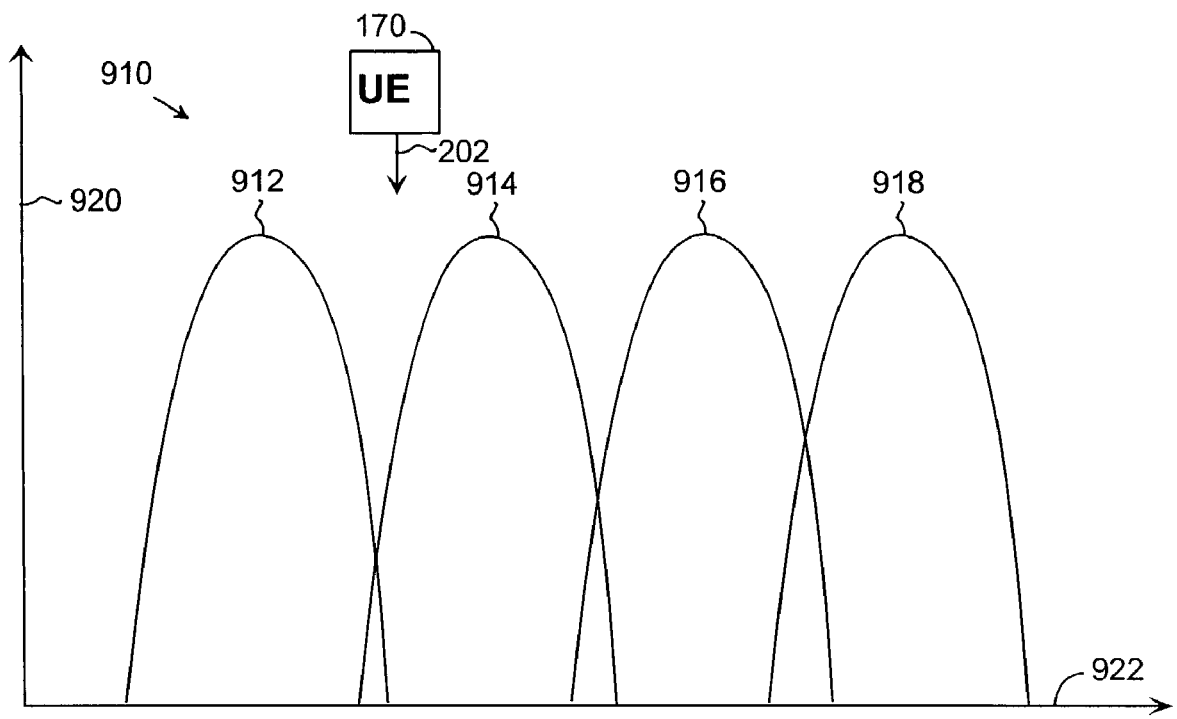
FIG. 9 shows an example of a primary radiation pattern.
Figure 10:
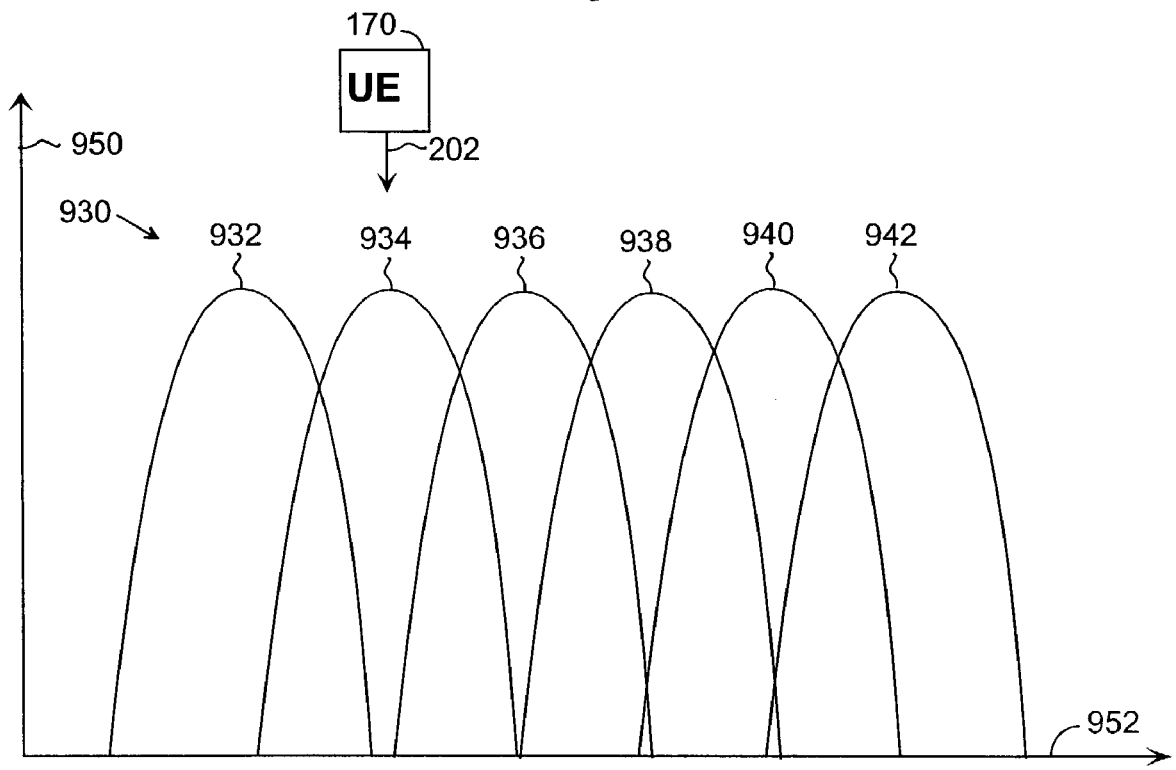
FIG. 10 shows an example of a secondary radiation pattern.

FIGS. 9 and 10 provide an example of forming the secondary beam-specific variables 232A, 232B, 232C using the primary beam-specific variables 222A, 222B and the transformation between the primary antenna beams 204A, 204B and the secondary antenna beams 244A, 244B, 244C. FIG. 9 illustrates a primary radiation pattern 910 with four primary beams 912 to 918. FIG. 10 illustrates a secondary radiation pattern 930 with six primary beams 932 to 942. In FIGS. 9 and 10, the user equipment 170 transmitting a signal 202 is also shown. The vertical axes 920, 950 show the gain of the radiation patterns 910 and 930, respectively, and the horizontal axes 922, 952 show the azimuth angle of the beam patterns 910, 930 with respect to the antenna array 210. The complex transformation weights carrying out the transformation between the primary antenna beams 204A, 204B and the secondary antenna beams 244A, 244B, 244C are shown, for example, in the following table:

|          | Beam 912      | Beam 914       | Beam 916       | Beam 918       |
|----------|---------------|----------------|----------------|----------------|
| Beam 932 | 1.37 − 0.19i  | −0.17 + 0.23i  | 0              | 0              |
| Beam 934 | 0.03 − 0.80i  | 0.86 + 0.92i   | 0              | 0              |
| Beam 936 | 0             | 1.13 − 0.65i   | −0.18 + 0.68i  | 0              |

-continued

|          | Beam 912 | Beam 914       | Beam 916       | Beam 918      |
|----------|----------|----------------|----------------|---------------|
| Beam 938 | 0        | −0.18 − 0.68i  | 1.13 + 0.65i   | 0             |
| Beam 940 | 0        | 0              | 0.86 − 0.92i   | 0.03 + 0.80i  |
| Beam 942 | 0        | 0              | −0.17 − 0.23i  | 1.37 + 0.19i  |

An assumption may be made, in this example, that the primary beam-specific variables $h_{912}^P$ and $h_{914}^P$ for the primary beams 912 and 914, respectively, have been determined using the signal 202. By applying the matrix representation given in Equation (10), the secondary beam-specific variable $h_{934}^S$ for the secondary beam 934 can be expressed by means of the primary beam-specific variables $h_{912}^P$ and $h_{914}^P$ as follows:

$$h_{934}^S = h_{912}^P(0.03-0.80i) + h_{914}^P(0.86+0.92i). \qquad (10)$$

In this case, the transformation may be truncated such that only the primary beams 912, 914 nearest to the secondary beam 934 are used.

According to FIGS. 9 and 10, the user equipment 170 may be located unfavourably in between the primary beams 912 and 914 in the primary radiation pattern 910; therefore, the downlink transmission using either of the primary beams 912 or 914 of the primary beam pattern 910 may cause a significant loss in gain. However, the gain may be substantially improved when using the secondary beam 934 of the secondary radiation pattern 930 in the downlink. The radio resource can be allocated to the user equipment 170 using the secondary beam specific variable $h_{934}^S$, which is obtained from the primary beam-specific variables by weighting the variables with predetermined weights. On a general level, the invention enables the resolution of the direction of arrival (DoA) determination to be improved.

Even though the invention has described above with reference to examples according to the accompanying drawings, it is clear that the invention is not restricted thereto but can be modified in several ways within the scope of the appended claims.

The invention claimed is:

1. A method, comprising:
    transmitting a signal by a user equipment, the method being used to allocate radio resources in a telecommunication system, wherein the telecommunication system comprises a base station capable of forming antenna beams;
    receiving the signal using at least two primary beams, wherein the signal is used to produce primary beam-specific signals;
    determining at least two secondary beam-specific variables associated with at least two secondary beams using the primary beam-specific signals and a transformation between primary antenna beams and secondary antenna beams, wherein at least one secondary beam is different from the at least two primary beams; and
    allocating radio resources to the user equipment based on the secondary beam-specific variables.

2. The method of claim 1, wherein said allocating further comprises allocating the radio resources using the at least one secondary beam.

3. The method of claim 1, wherein transmitting further comprises:
    transmitting the signal using the user equipment, wherein the signal comprises a predetermined symbol sequence; and determining the secondary beam specific variables using the symbol sequence.

4. The method of claim 1, wherein receiving the signal further comprises:
receiving the signal using at least two antenna elements in an antenna array to produce primary antenna-element-specific signals; and
transforming at least two primary antenna-element-specific signals into the primary beam-specific signals using primary antenna weights associated with the at least two primary beams.

5. The method of claim 1, wherein determining the at least two secondary beam-specific variables further comprises:
determining at least two primary beam-specific variables using the primary beam-specific signals; and
forming the secondary beam-specific variables using the primary beam-specific variables and the transformation between the primary antenna beams and the secondary antenna beams.

6. The method of claim 1, wherein determining the secondary beam-specific variables further comprises:
forming secondary beam-specific signals associated with the at least two secondary beams using the primary beam-specific signals and the transformation between the primary antenna beams and the secondary antenna beams; and
determining the at least two secondary beam-specific variables using the secondary beam-specific signals.

7. The method of claim 1, further comprising:
determining at least two secondary beam-specific quality variables; allocating the radio resources; and
allocating the radio resources by selecting at least one secondary beam for radio resource allocation based on the secondary beam-specific quality variables.

8. The method of claim 1, wherein allocating the radio resources to the user equipment further comprises:
estimating an estimated direction of arrival of the signal received by the at least two primary beams using the at least two secondary beam-specific variables; and
allocating the radio resources to the estimated direction.

9. The method of claim 1, wherein allocating the radio resources to the user equipment further comprises:
generating at least one user signal to be transmitted to the user equipment; and
transmitting the at least one user signal to the user equipment in a secondary antenna beam direction by weighting the at least one user signal with antenna weights associated with the secondary antenna beam direction.

10. The method of claim 1, wherein allocating the radio resources to the user equipment further comprises:
receiving an uplink user signal from the user equipment using at least two antenna elements of an antenna array to produce primary antenna-element-specific user signals; and
transforming the primary antenna-element-specific user signals into at least one secondary uplink beam-specific user signal using secondary antenna weights associated with the secondary antenna beams and the at least two secondary beam-specific variables.

11. The method of claim 1, wherein allocating the radio resources to the user equipment further comprises adapting the allocation of the radio resources to prevailing requirements of the telecommunication system.

12. The method of claim 1, further comprising providing the transformation between the primary antenna beams and the secondary antenna beams comprising pre-determined complex weights, wherein the complex weights accounts for at least one of primary antenna weights, antenna geometry, carrier frequency associated with primary beams, and carrier frequency associated with secondary beams.

13. A method comprising:
transmitting a signal by a user equipment, the method being used to allocate radio resources in a telecommunication system, wherein the telecommunication system comprises a base station capable of forming antenna beams;
receiving the signal using at least two primary beams, wherein the signal is used to produce primary beam-specific signals;
determining at least two secondary beam-specific estimates of channel impulse responses associated with at least two secondary beams using the primary beam-specific signals and a transformation between primary antenna beams and secondary antenna beams, wherein at least one secondary beam is different from the at least two primary beams; and
allocating radio resources to the user equipment based on the secondary beam-specific estimates of channel impulse responses.

14. A telecommunication system, comprising:
a base station and user equipment,
wherein the base station comprises an antenna array for providing a radio link for signals transmitted between the base station and the user equipment, and a beam forming unit connected to an antenna array for forming antenna beams;
wherein the beam forming unit is configured to form at least two primary beams for signal reception using primary antenna weights and the antenna array;
wherein the user equipment is configured to transmit a signal;
wherein the antenna array and the beam forming unit are configured to receive the transmitted signal using the at least two primary beams, wherein the signal is used to produce primary beam-specific signals as an output;
wherein the base station comprises processing a unit connected to the beam forming unit for determining at least two secondary beam-specific variables associated with at least two secondary beams using the primary beam-specific signals as an input and a transformation between the primary antenna beams and the secondary antenna beams, wherein at least one secondary antenna beam being different from any one of the primary antenna beams; and
a telecommunication system further comprises an allocation unit configured to allocate radio resources to the user equipment based on the secondary beam-specific variables.

15. The telecommunication system of claim 14, wherein the beam forming unit is configured to form at least one secondary beam and the allocation unit is configured to allocate the radio resources using the secondary beam.

16. The telecommunication system of claim 14, wherein the user equipment is configured to transmit a signal including a predetermined symbol sequence, and
wherein the processing unit is configured to determine the at least two secondary beam-specific variables using the predetermined symbol sequence.

17. The telecommunication system of claim 14, wherein the antenna array comprises at least two antenna elements for receiving the signal used to produce primary antenna-element-specific signals as the output, and wherein the beam forming unit is configured to transform the primary antenna-element-specific signals into primary beam-specific signals using primary antenna weights associated with the at least two primary beams.

18. The telecommunication system of claim 14, wherein the processing unit is configured to determine at least two primary beam-specific variables using the primary beam-specific signals, and
wherein the processing unit is configured to form the at least two secondary beam-specific variables using the primary beam-specific variables and the transformation between the primary antenna beams and the secondary antenna beams.

19. The telecommunication system of claim 14, wherein the processing unit is configured to form secondary beam-specific signals associated with the at least two secondary beams using the primary beam-specific signals and the transformation between the primary antenna beams and the secondary antenna beams, and
wherein the processing unit is configured to determine the at least two secondary beam-specific variables using secondary beam-specific signals.

20. The telecommunication system of claim 14, wherein the processing unit is configured to determine at least two secondary beam-specific quality variables, and
wherein the allocation unit is configured to select at least one secondary beam for radio resource allocation based on the secondary beam-specific quality variables.

21. The telecommunication system of claim 14, wherein the processing unit is configured to estimate an estimated direction of the signal received by the primary beams using the at least two secondary beam-specific variables, and
wherein the allocation unit is configured to allocate the radio resources to the estimated direction.

22. The telecommunication system of claim 14, wherein the base station comprises a user signal generator for generating a user signal to be transmitted to the user equipment using at least one secondary beam, and
wherein the beam forming unit is configured to transmit the user signal to the user equipment using the secondary beam by weighting the user signal with secondary antenna weights associated with the secondary antenna beams.

23. The telecommunication system of claim 14, wherein the antenna array is configured to receive an uplink user signal from the user equipment using at least two antenna elements of the antenna array to produce primary antenna-element-specific user signals as the output, and
wherein the beam forming unit and the processing unit are configured to transform the primary antenna-element-specific user signals into at least one secondary uplink beam-specific user signal using secondary antenna weights associated with the secondary antenna beam and the at least two secondary beam-specific variables.

24. The telecommunication system of claim 14, wherein the allocation unit is configured to adapt the allocation of the radio resources to the user equipment to prevailing requirements of the telecommunication system.

25. The telecommunication system of claim 14, wherein the processing unit is configured to carry out the transformation between the primary antenna beams and the secondary antenna beams using pre-determined complex weights, wherein the complex weights accounts for a factor of at least one of primary antenna weights, antenna geometry, carrier frequency associated with primary beams, and carrier frequency associated with secondary beams.

26. A telecommunication system, comprising:
a base station and user equipment,
wherein the base station comprises an antenna array for providing a radio link for signals transmitted between the base station and the user equipment, and a beam forming unit connected to an antenna array for forming antenna beams;
wherein the beam forming unit is configured to form at least two primary beams for signal reception using primary antenna weights and the antenna array;
wherein the user equipment is configured to transmit a signal;
wherein the antenna array and the beam forming unit are configured to receive the transmitted signal using the at least two primary beams, wherein the signal is used to produce primary beam-specific signals as an output;
wherein the base station comprises processing a unit connected to the beam forming unit for determining at least two secondary beam-specific estimates of channel impulse responses associated with at least two secondary beams using the primary beam-specific signals as an input and a transformation between the primary antenna beams and the secondary antenna beams, wherein at least one secondary antenna beam being different from any one of the primary antenna beams; and
a telecommunication system further comprises an allocation unit configured to allocate radio resources to the user equipment based on the secondary beam-specific estimates of channel impulse responses.

27. A base station of a telecommunication system, comprising:
an antenna array for providing a radio link for signals transmitted between the base station and a user equipment;
a beam forming unit connected to an antenna array for forming antenna beams, the beam forming unit being configured to form at least two primary beams for signal reception using primary antenna weights and the antenna array, wherein the antenna array and the beam forming unit are configured to receive a signal transmitted from the user equipment by using the at least two primary beams, wherein the signal is used to produce primary beam-specific signals as an output;
a processing unit connected to the beam forming unit for determining at least two secondary beam-specific variables associated with at least two secondary beams using the primary beam-specific signals as an input and a transformation between the primary antenna beams and the secondary antenna beams, wherein at least one secondary antenna beam is different from any one of the primary antenna beams; and
an allocation unit configured to allocate radio resources to the user equipment based on the secondary beam-specific variables.

28. An apparatus, comprising:
a base station and user equipment,
wherein the base station comprises an antenna array for providing a radio link for signals transmitted between the base station and the user equipment, and beam forming means connected to an antenna array for forming antenna beams;
wherein the beam forming means are configured to form at least two primary beams for signal reception using primary antenna weights and the antenna array;
wherein the user equipment is configured to transmit a signal;

wherein the antenna array and the beam forming means are configured to receive the transmitted signal using the at least two primary beams, wherein the signal is used to produce primary beam-specific signals as an output;

wherein the base station comprises processing means connected to the beam forming means for determining at least two secondary beam-specific variables associated with at least two secondary beams using the primary beam-specific signals as an input and a transformation between the primary antenna beams and the secondary antenna beams, wherein at least one secondary antenna beam being different from any one of the primary antenna beams; and a telecommunication system further comprises allocation means for allocating radio resources to the user equipment based on the secondary beam-specific variables.

29. A apparatus, comprising:

an antenna array for providing a radio link for signals transmitted between the base station and a user equipment;

beam forming means connected to an antenna array for forming antenna beams, the beam forming means being configured to form at least two primary beams for signal reception using primary antenna weights and the antenna array, wherein the antenna array and the beam forming means are configured to receive a signal transmitted from the user equipment by using the at least two primary beams, wherein the signal is used to produce primary beam-specific signals as an output;

processing means connected to the beam forming means for determining at least two secondary beam-specific variables associated with at least two secondary beams using the primary beam-specific signals as an input and a transformation between the primary antenna beams and the secondary antenna beams, wherein at least one secondary antenna beam is different from any one of the primary antenna beams; and allocation means for allocating radio resources to the user equipment based on the secondary beam-specific variables.

30. A base station of a telecommunication system, comprising:

an antenna array for providing a radio link for signals transmitted between the base station and a user equipment;

a beam forming unit connected to an antenna array for forming antenna beams, the beam forming unit being configured to form at least two primary beams for signal reception using primary antenna weights and the antenna array, wherein the antenna array and the beam forming unit are configured to receive a signal transmitted from the user equipment by using the at least two primary beams, wherein the signal is used to produce primary beam-specific signals as an output;

a processing unit connected to the beam forming unit for determining at least two secondary beam-specific estimates of channel impulse responses associated with at least two secondary beams using the primary beam-specific signals as an input and a transformation between the primary antenna beams and the secondary antenna beams, wherein at least one secondary antenna beam is different from any one of the primary antenna beams; and an allocation unit configured to allocate radio resources to the user equipment based on the secondary beam-specific estimates of channel impulse responses.

31. An apparatus, comprising:

a base station and user equipment, wherein the base station comprises an antenna array for providing a radio link for signals transmitted between the base station and the user equipment, and beam forming means connected to an antenna array for forming antenna beams;

wherein the beam forming means are configured to form at least two primary beams for signal reception using primary antenna weights and the antenna array;

wherein the user equipment is configured to transmit a signal;

wherein the antenna array and the beam forming means are configured to receive the transmitted signal using the at least two primary beams, wherein the signal is used to produce primary beam-specific signals as an output;

wherein the base station comprises processing means connected to the beam forming means for determining at least two secondary beam-specific estimates of channel impulse responses associated with at least two secondary beams using the primary beam-specific signals as an input and a transformation between the primary antenna beams and the secondary antenna beams, wherein at least one secondary antenna beam being different from any one of the primary antenna beams; and a telecommunication system further comprises allocation means for allocating radio resources to the user equipment based on the secondary beam-specific estimates of channel impulse responses.

32. A apparatus, comprising:

an antenna array for providing a radio link for signals transmitted between the base station and a user equipment;

beam forming means connected to an antenna array for forming antenna beams, the beam forming means being configured to form at least two primary beams for signal reception using primary antenna weights and the antenna array, wherein the antenna array and the beam forming means are configured to receive a signal transmitted from the user equipment by using the at least two primary beams, wherein the signal is used to produce primary beam-specific signals as an output;

processing means connected to the beam forming means for determining at least two secondary beam-specific estimates of channel impulse responses associated with at least two secondary beams using the primary beam-specific signals as an input and a transformation between the primary antenna beams and the secondary antenna beams, wherein at least one secondary antenna beam is different from any one of the primary antenna beams; and allocation means for allocating radio resources to the user equipment based on the secondary beam-specific estimates of channel impulse responses.

* * * * *